United States Patent
Vasseur et al.

(10) Patent No.: US 11,063,861 B2
(45) Date of Patent: Jul. 13, 2021

(54) ENSURING BACKUP PATH PERFORMANCE FOR PREDICTIVE ROUTING IN SD-WANS

(71) Applicant: Cisco Technology, Inc., San Jose, CA (US)

(72) Inventors: Jean-Philippe Vasseur, Saint Martin d'uriage (FR); Grégory Mermoud, Veyras VS (CH); Vinay Kumar Kolar, San Jose, CA (US); Sharon Shoshana Wulff, Zurich (CH)

(73) Assignee: Cisco Technology, Inc., San Jose, CA (US)

( * ) Notice: Subject to any disclaimer, the term of this patent is extended or adjusted under 35 U.S.C. 154(b) by 134 days.

(21) Appl. No.: 16/429,159

(22) Filed: Jun. 3, 2019

(65) Prior Publication Data
US 2020/0382414 A1 Dec. 3, 2020

(51) Int. Cl.
*H04L 12/703* (2013.01)
*H04L 12/46* (2006.01)
*H04L 12/24* (2006.01)
*H04L 12/715* (2013.01)

(52) U.S. Cl.
CPC .......... *H04L 45/28* (2013.01); *H04L 12/4633* (2013.01); *H04L 41/5009* (2013.01); *H04L 41/5025* (2013.01); *H04L 45/64* (2013.01)

(58) Field of Classification Search
CPC . H04L 45/28; H04L 12/4633; H04L 41/5009; H04L 41/5025; H04L 45/64; H04L 47/2425; H04L 47/823; H04L 47/825; H04L 47/127
See application file for complete search history.

(56) References Cited

U.S. PATENT DOCUMENTS

| | | | | |
|---|---|---|---|---|
| 9,838,317 | B1 * | 12/2017 | Yadav | H04L 43/0829 |
| 9,853,882 | B2 | 12/2017 | Vasseur et al. | |
| 2015/0195192 | A1 * | 7/2015 | Vasseur | G06F 11/2007 714/47.3 |
| 2015/0333953 | A1 * | 11/2015 | Vasseur | H04L 47/127 370/228 |
| 2017/0317744 | A1 * | 11/2017 | Skalecki | H04J 14/0287 |
| 2019/0052558 | A1 * | 2/2019 | Mehta | H04L 41/142 |

OTHER PUBLICATIONS

European Search Report dated Aug. 31, 2020 in connection with European Application No. EP 20 17 6905.
U.S. Appl. No. 16/362,819, filed Mar. 25, 2019, Vasseur et al., Unpublished.
U.S. Appl. No. 16/392,825, filed Apr. 24, 2019, Wulff et al., Unpublished.
U.S. Appl. No. 16/425,093, filed May 29, 2019, Vasseur et al., Unpublished.

* cited by examiner

*Primary Examiner* — Walli Z Butt
(74) *Attorney, Agent, or Firm* — Behmke Innovation Group LLC; Kenneth J. Heywood; Jonathon P. Western

(57) ABSTRACT

In one embodiment, a device predicts a failure of a first tunnel in a software-defined wide area network (SD-WAN). The device makes a prediction as to whether a second tunnel in the SD-WAN will satisfy a service level agreement (SLA) associated with traffic on the first tunnel. The device proactively reroutes the traffic from the first tunnel onto the second tunnel, based on the prediction as to whether that the second tunnel will satisfy the SLA of the traffic. The device monitors one or more quality of service (QoS) metrics for the rerouted traffic, to ensure that the second tunnel satisfies the SLA of the traffic.

20 Claims, 14 Drawing Sheets

ENSURING BACKUP PATH PERFORMANCE FOR PREDICTIVE ROUTING IN SD-WANS

TECHNICAL FIELD

The present disclosure relates generally to computer networks, and, more particularly, to ensuring backup path performance for predictive routing in software-defined wide area network (SD-WAN).

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits. While this approach is somewhat effective at mitigating tunnel failures in an SD-WAN, reactive failure detection is also predicated on a failure first occurring. This means that traffic will be affected by the failure, until the traffic is moved to another tunnel.

With the recent evolution of machine learning, predictive failure detection and proactive routing in an SD-WAN now becomes possible through the use of machine learning techniques. However, tunnel failures in SD-WANs are relatively rare events, with potentially thousands of examples of normal behavior for each example of a failure. This imbalance in the available training dataset for the prediction model gives way to the potential for false positives to occur (i.e., the model incorrectly predicts a tunnel failure). These false positives can be quite costly, particularly if the traffic is rerouted onto a backup path/tunnel that does not offer the same performance as that of the original.

DESCRIPTION OF EXAMPLE EMBODIMENTS

Overview

Figure 1A:
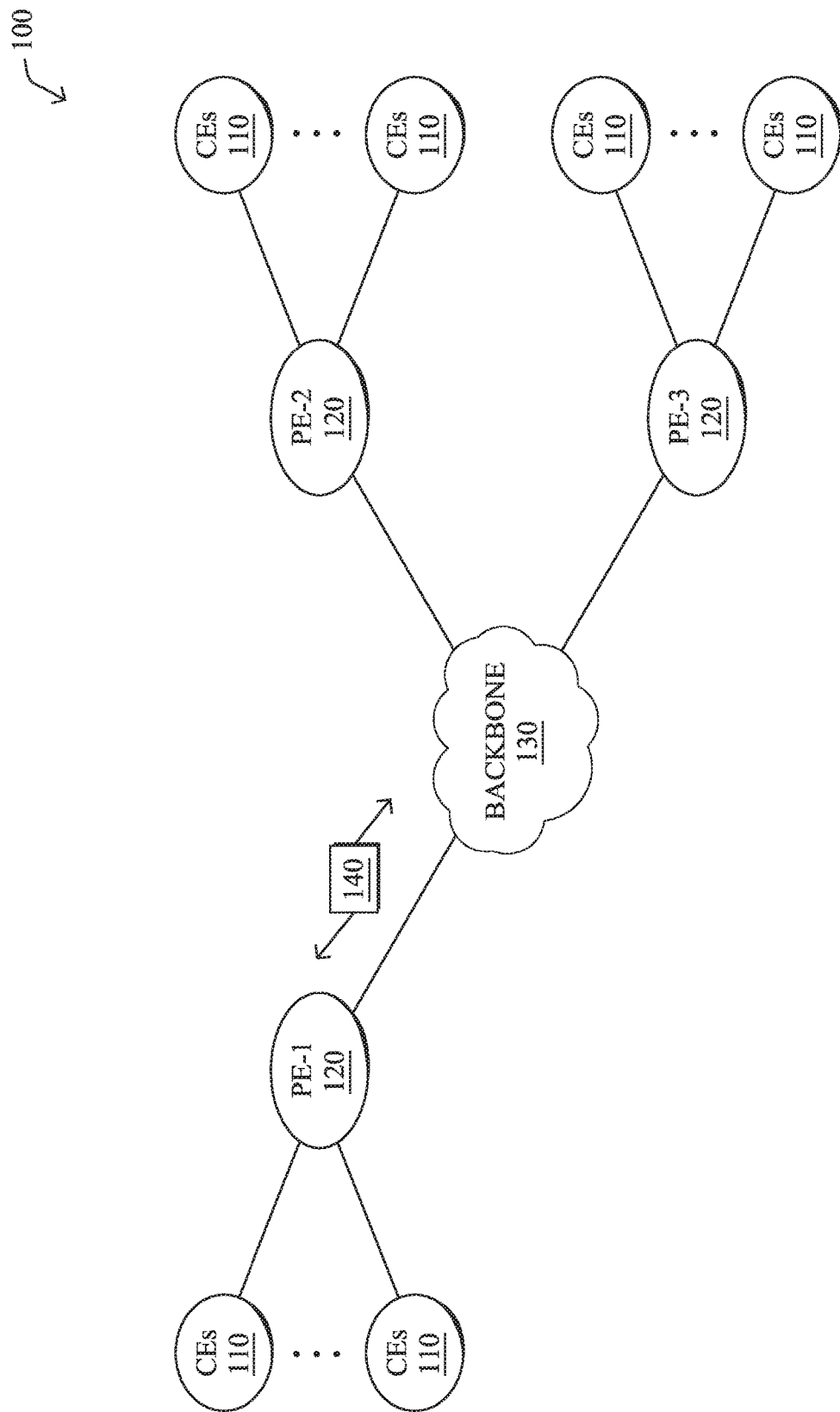
FIGS. 1A-1B illustrate an example communication network.

According to one or more embodiments of the disclosure, a device predicts a failure of a first tunnel in a software-defined wide area network (SD-WAN). The device makes a prediction as to whether a second tunnel in the SD-WAN will satisfy a service level agreement (SLA) associated with traffic on the first tunnel. The device proactively reroutes the traffic from the first tunnel onto the second tunnel, based on the prediction as to whether that the second tunnel will satisfy the SLA of the traffic. The device monitors one or more quality of service (QoS) metrics for the rerouted traffic, to ensure that the second tunnel satisfies the SLA of the traffic.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
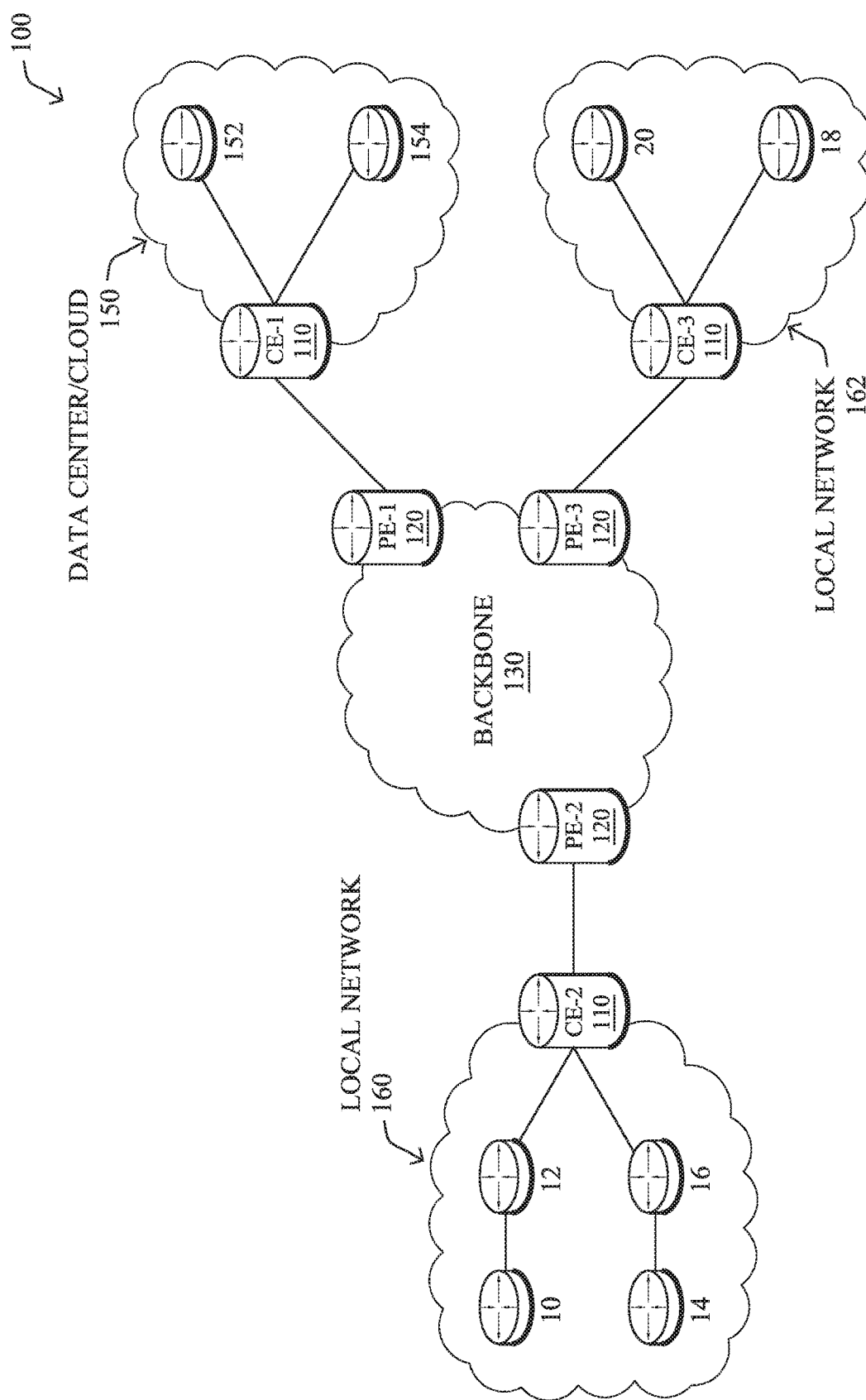

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
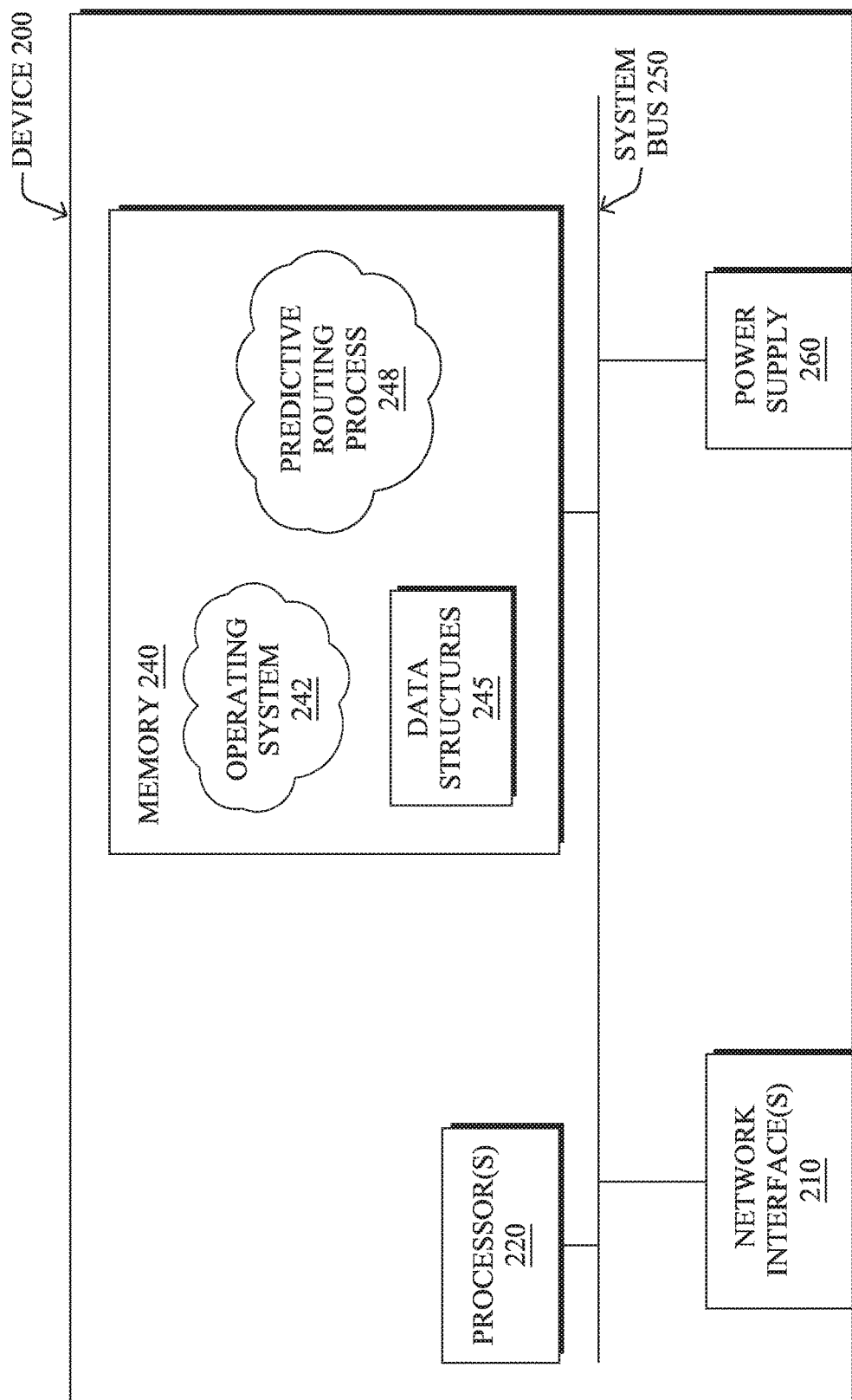
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 248 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, predictive routing process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may also include computer executable instructions that, when executed by processor(s) 220, cause device 200 to predict failures of network elements in the network (e.g., a link or node/device), thereby allowing device 200 to proactively reroute traffic to avoid the failed element. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample network telemetry that has been labeled as indicative of a network element failure, such as failure of a link or node/device, or indicative of normal operation. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that a network element will fail. Conversely, the false negatives of the model may refer to the number of times the model predicted normal network element operations, when the network element actually fails. True negatives and positives may refer to the number of times the model correctly predicted whether a network element will perform normally or will fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, failure detection in a network has traditionally been reactive, meaning that the failure must first be detected before rerouting the traffic along a secondary (backup) path. This is true, not only for IP and MPLS networks, but also for optical networks (with protection and restoration) such as SONET and SDH networks. Typically, failure detection leverages either explicit signaling from the lower network layers (e.g., optical failures signaled to the upper layers) or using a keep-alive mechanism that sends probes at some interval T that must be acknowledged by a receiver (e.g., a tunnel tail-end router). For example, routing protocols such as Open Shortest Path First (OSPF) and Intermediate System to Intermediate System (ISIS) use keep-alive signals over routing adjacencies or MPLS traffic engineering (TE) tunnels. Protocols such as Bidirectional Forwarding Detection (BFD) also make use of keep-alive mechanisms.

Traditionally, failure detection in an SD-WAN has relied on the keep-alive mechanisms of BFD over tunnels, such as IPSec tunnels. When the BFD signaling times out, the tunnel is flagged as failed and traffic is rerouted onto another tunnel. While this approach does help to mitigate the effects of the failure, the reactive nature of this approach also means that at least some of the traffic will be lost.

Figure 3:
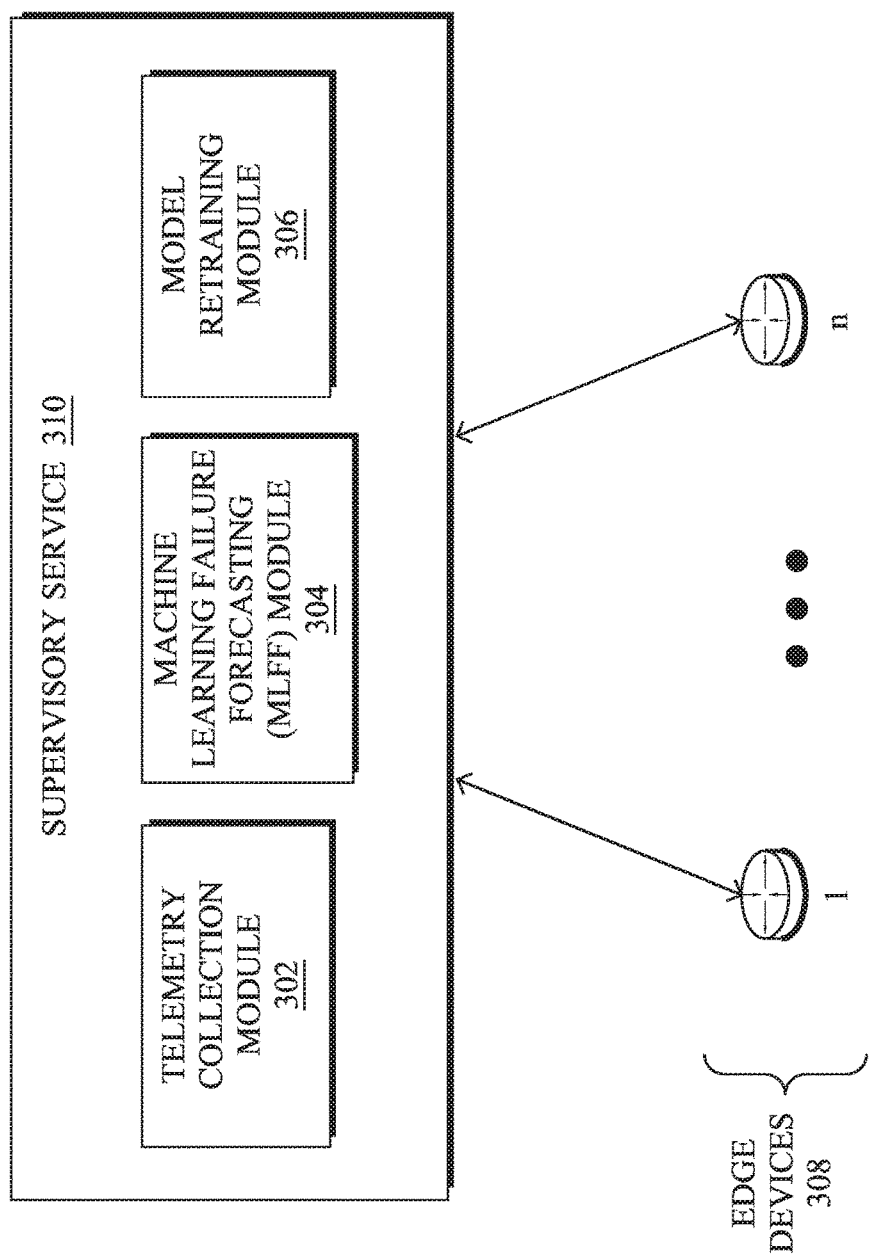
FIG. 3 illustrates an example architecture for predicting failures in a network.

FIG. 3 illustrates an example architecture 300 for predicting failures in network, according to various embodiments. In general, architecture 300 may include a supervisory service 310 located in the cloud or implemented locally in the network under scrutiny, such as a supervisory service for an SD-WAN. As shown, supervisory service 310 may include the following components: a telemetry collection module 302, a machine learning failure forecasting (MLFF) module 304, and/or a model retraining module 306. These components 302-306 may be implemented in a distributed manner or implemented as their own stand-alone services, either as part of the network under observation or as a remote service. In addition, the functionalities of the components of architecture 300 may be combined, omitted, or implemented as part of other processes, as desired.

Supervisory service 310 may be in communication with any number of devices 308 (e.g., a first through $n^{th}$ device), which may be CE routers 110 and/or PE routers 120, described previously, or other forms of networking devices configured to convey traffic through the network. In various embodiments, devices 308 may be part of the same SD-WAN or, in cases in which supervisory service 310 is implemented as a cloud-based service, part of any number of different SD-WANs or other networks.

In general, there are many circumstances in a network that can lead to failures in various areas of the network between a head-end and tail-end router (e.g., between routers 110, etc.). An objective of MLFF 304, as detailed below, is to learn early signs (networking behavioral) that have some predictive power, allowing the model to predict/forecast a tunnel failure or a failure of a network element supporting the tunnel. It is expected that some failures are predictable (i.e., there exist early signs of an upcoming failure) while others will not be non predictable (e.g., fiber cut, router crash, etc.). More specifically, almost all failures exhibit early signs, but those signs may appear only a few milliseconds (or even nanoseconds), prior to the failure (e.g. fiber cut), thereby making forecasting an almost impossible task. Some non-predictable failures may be due to the absence of signaling back to the device 308 involved and may be localized to the core of the service provider network (e.g., the underlying IP, 4G, 5G, etc. network), in which case the failure is non-predicable from the perspective of the device 308.

A first aspect of architecture 300 relates to telemetry collection module 302 obtaining the telemetry data required for model training by MLFF module 304. As used herein, the term 'relevant telemetry' refers to a telemetry measurement variable with predictive power to predict failures, which can be determined dynamically by MLFF module 304. Indeed, failures may be predictable, yet not successfully predicted, due to a lack of relevant telemetry, the inability of the model to predict the failure, or the telemetry is sampled at too coarse of a time granularity. In some embodiments, to obtain relevant telemetry from devices 308, supervisory service 310 may send a custom request to one or more of devices 308 with the objective of obtaining the list of events of interest along with the set of candidate telemetry variables with potential predictive power to predict failures. In further embodiments, devices 308 may instead provide the telemetry data to supervisory service 310 on a push basis (e.g., without service 310 first requesting the telemetry data).

In various embodiments, telemetry collection module 302 may adjust the set of telemetry variables/parameters obtained from the device(s) 308 and/or their sampling frequency. If, for example, MLFF module 304 determines that a particular telemetry variable has a strong predictive power (according to the feature importance, Shapley values, etc.), the frequency at which such a variable may be gathered may be higher compared to a variable with lower predictive power. MLFF module 304 may also determine the predictive power of a particular telemetry variable by assessing the conditional probabilities involved, in further embodiments.

MLFF module 304 may also select the set of most relevant telemetry variables. In turn, telemetry collection module 302 may request that devices 308 measure and send these variables to supervisory service 310 periodically, since real-time variations of such telemetry is needed for forecasting failure events. For example, based on the above conclusion, MLFF module 304 may determine that the CPU and memory utilizations of one or more networking devices that support a given tunnel should be sent periodically (e.g., every 1 second) by devices 308.

Other telemetry variables, such as during a rekey failure when a device 308 is not able to successfully exchange the security keys with the controller, may also be requested to be sent to supervisory service 310, on occurrence of the event. Since such events are rare and the states of the variables remain the same for longer periods of time, telemetry collection module 302 may request an event-based push request, rather than periodic messages. In other words, telemetry collection module 302 may instruct one or more of devices 308 to report certain telemetry variables only after occurrence of certain events. For example, Table 1 below shows some example telemetry variables and when a device 308 may report them to supervisory service 310:

TABLE 1

| Relevant Telemetry | Request Type |
| --- | --- |
| Memory_utilization | Requested from head and tail edge routers. |
| CPU Utilization | |
| BFD Probe Latency, Loss and Jitter | Periodically once every 1 second. |
| Queue statistics (%-age drops for different queues) | |
| Interface down event | Requested from both head and tail edge routers |
| Rekey exchange failure | |
| Router crash logs | Upon event occurrence. |

In a further embodiment, MLFF module 304 may also attempt to optimize the load imposed on the device(s) 308 reporting the telemetry variables to supervisory service 310. For example, MLFF module 304 may determine that the CPU and memory usages should be measured and reported every minute to supervisory service 310.

A key functionality of MLFF module 304 is to train any number of machine learning-based models to predict network element failures. Preferably, the models are time-series models trained centrally (e.g., in the cloud) using the telemetry collected by telemetry collection module 302. In one instantiation of MLFF module 304, the models may be trained on a per network instance or per-SD-WAN basis. Testing has shown that model performance may be influenced by parameters specific to a given network instantiation, thus promoting an implementation whereby MLFF module 304 trains a model for a specific network deployment. In further embodiments, MLFF module 304 may even train certain models on a per-tunnel basis. Although such an approach may be of limited scalability, it may be highly valuable for tunnels carrying a very large amount of potentially very sensitive traffic (e.g., inter-cloud/data center traffic).

As pointed out earlier, with current reactive routing approaches, recall (i.e., the proportion of failures being successfully predicted) is simply equal to 0, since rerouting is always reactive. In other words, the system reacts a posteriori. As a result, any recall >0 is a significant gain. One performance metric that MLFF module 304 may consider is the maximum recall (Max_Recall) achieved by the model given a precision >P_Min. For example, MLFF module 304 may evaluate the variability of Max_Recall across datasets, should a single model be trained across all datasets, to determine whether an SD-WAN specific or even a tunnel specific model should be trained.

In various embodiments, MLFF module 304 may dynamically switch between per-tunnel, per-network/SD-WAN, and global (multiple SD-WAN) approaches to model training. For example, MLFF module 304 may start with the least granular approach (e.g., a global model across all networks/SD-WANs) and then evaluate the performance of the global model versus that of per-customer/SD-WAN models. Such model performance comparison could be easily evaluated by comparing their related precision-recall curves (PRCs)/area under the curve (AUCs), or the relative Max_Recall, given that Precision >P_min.

In some cases, MLFF module 304 may employ a policy to trigger per-customer/SD-WAN specific model training, if the Max_Recall value improvement is greater than a given threshold. In another embodiment, a similar policy approach may be used to specifically require a dedicated model for a given tunnel according to its characteristic (between router A and router B), the type of traffic being carried out (e.g., sensitive traffic of type T, etc.), or the performance of the global or SD-WAN specific model for that tunnel. In such a case, the devices 308 may be in charge of observing the routed traffic and, on detecting a traffic type matching the policy, request specific model training by MLFF module 304, to start per-tunnel model training for that tunnel.

Prototyping of the techniques herein using simple models and input features based on coarse telemetry, such as 1-minute averages of loss, latency, jitter, traffic, as well as CPU/memory of CE routers, lead to recalls in the range of a few percent with a precision of 80% or more. More advanced time-series models, such as long short-term memories (LSTMs), especially with attention mechanisms, will achieve even better performance. More importantly, using richer and more fine-grained telemetry is an important driver of the forecasting performance.

Once MLFF module 304 has trained a prediction model, different options exist for its inference location (e.g., where the model is executed to predict failures). In a first embodiment, model inference is performed centrally (in the cloud), thus co-located with the model training. In such a case, once MLFF module 304 identifies the set of telemetry variables with predictive power (used for prediction), telemetry collection module 302 may send a custom message to the corresponding device(s) 308 listing the set of variables along with their sampling/reporting frequencies. Note that sampling is a dynamic parameter used by MLFF module 304 computed so as to optimize the PRC of the model against the additional overhead of the device 308 pushing additional data to the cloud (and also generating additional logging of data on the router).

In another embodiment, MLFF module 304 may push the inference task, and the corresponding prediction model, to a specific device 308, so that the prediction is preformed on-premise. Such an approach may be triggered by the frequency of sampling required to achieve the required model performance. For example, some failure types are known to provide signal a few seconds, or even milliseconds, before the failure. In such cases, performing the inference in the cloud is not a viable option, making on-premise execution of the model the better approach. Inference/model execution is usually not an expensive task on premise, especially when compared to model training. That being said, it may require fast processing on local event with an impact on the local CPU. In yet another embodiment, some models may be executed on premise, if the local resources on the router/device 308 are sufficient to feed the local model.

Thus, in some cases, the techniques herein support centralized model training (e.g., in the cloud), combined with the ability to perform local (on-premise) inference based on the required sampling frequency, local resources available on the device 308, as well as the bandwidth required to send the telemetry for input to a model in the cloud. For example, one failure prediction model may require a slow sampling rate but a large amount of data, due to a high number of input features with predictive power. Thus, reporting these telemetry variables to the cloud for prediction may consume too much WAN bandwidth on the network. In such a case, MLFF module 304 may take this constraint into account by evaluating the volume of required telemetry, according to the sampling frequency, and the WAN bandwidth allocated on the network for the telemetry traffic. To that end, MLFF module 304 may analyze the topology of the network and the available bandwidth for telemetry reporting, e.g., according to the quality of service (QoS) policy. If the bandwidth available for the telemetry used for the inference of the model exceeds the capacity, MLFF module 304 may decide to activate a local inference by pushing a prediction model to one or more of devices 308.

In yet another embodiment, MLFF module 304 may take a mixed approach whereby some of devices 308 perform the inferences locally, while others rely on supervisory service 310 to perform the predictions.

A further embodiment of the techniques herein introduces a feedback mechanism whereby feedback regarding the predictions by a trained model is provided to model retraining module 306. In cases in which the model is executed on device 308, the device 308 may report the rate of false positives and/or false negatives to model retraining module 308. Optionally, the reporting can also include additional context information about each false positive and/or false negative, such as the values of the telemetry variables that led to the incorrect prediction. If the performance of the model is below a designated threshold, model retraining module 306 may trigger MLFF module 304 to retrain the model, potentially increasing the granularity of the model, as well (e.g., by training a tunnel-specific model, etc.). In cases in which MLFF module 304 trains multiple prediction models, model retraining module 306 may evaluate the performance of each model and, based on their performances, decide that a particular one of the models should be used. Such an approach allows MLFF module 304 to dynamically switch between models, based on the data pattern currently being observed.

When failures are predicted in the cloud by supervisory service 310, model retraining module 306 may similarly receive feedback from devices 308 regarding the predictions. For example, once a model M predicts the failure of a tunnel at a given time, MLFF module 304 may send a notification to the affected device 308 indicating the (list of) tunnel(s) for which a failure is predicted, along with the predicted time for the failure, and other parameters such as the failure probability Pf (which can be a simple flag, a categorical variable (low, medium, high) or a real number). The device 308 may use $P_f$ to determine the appropriate action, such as pro-actively rerouting the traffic that would be affected by the failure onto a backup tunnel. In one embodiment, the predicted failure may be signaled to the device 308 using a unicast message for one or more tunnels, or a multicast messages signaling a list of predicted failure to a set of devices 308.

Regardless of how model retraining module 306 receives its feedback, either from the device 308 executing the prediction model or from MLFF module 304 executing the model, model retraining module 306 may dynamically trigger MLFF module 304 to retrain a given model. In one embodiment, the model re-training may be systematic. In another embodiment, upon reaching a plateau in terms of improvement for Max_Recall or Max_Precision, model retraining module 306 may reduce the frequency of the model training.

Figure 4A:
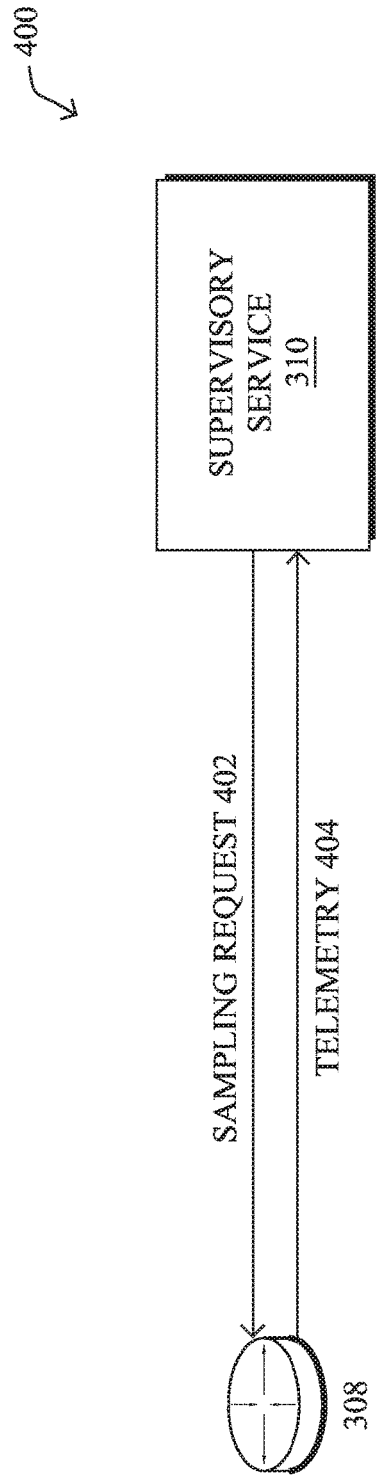
FIGS. 4A-4C illustrate examples of feedback for failure predictions.
Figure 4B:
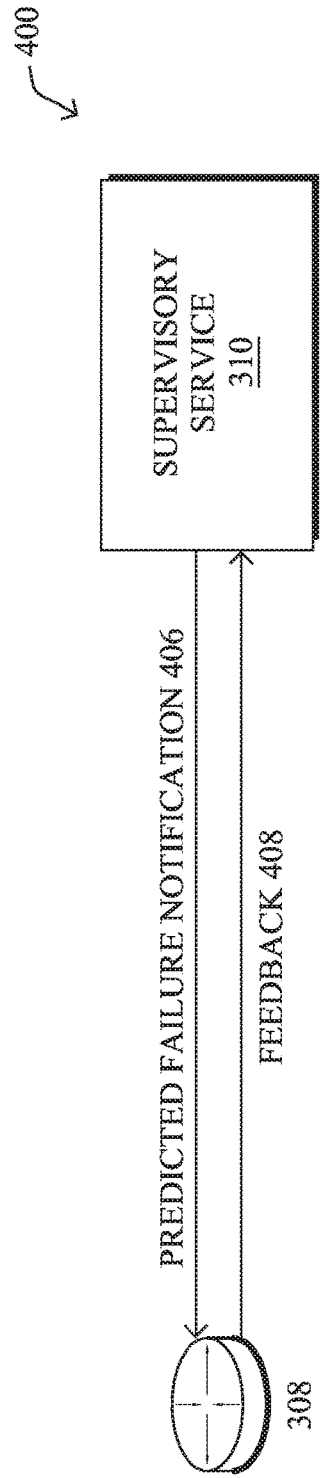
Figure 4C:
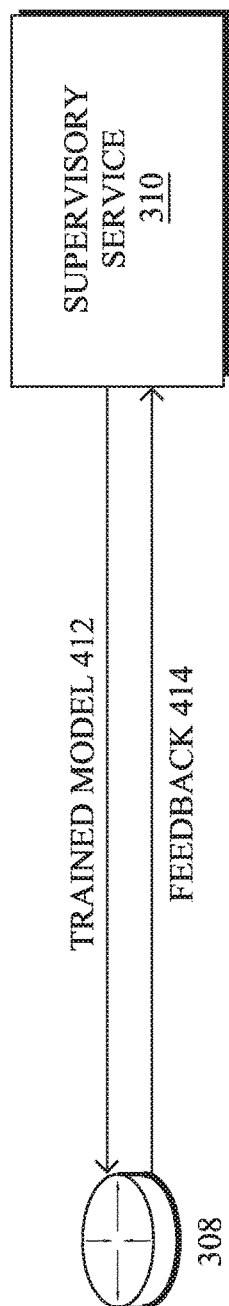

FIGS. 4A-4C illustrate examples of feedback for failure predictions, in various embodiments. As shown in example implementation 400 in FIGS. 4A-4B, assume that the trained model is executed in the cloud by supervisory service. In such a case, supervisory service 310 may send a sampling request 402 to a device 308 that indicates the telemetry variables to sample and report, as well as the determined sampling/reporting period(s) for those variables. In turn, device 308 may report the requested telemetry 404 to supervisory service 310 for analysis. For example, supervisory service 310 may request that device 308 report is CPU load every minute to supervisory service 310, to predict whether the tunnel associated with device 308 is predicted to fail. More specifically, supervisory service 310 may use telemetry 404 as input to its trained prediction model, to determine whether telemetry 404 is indicative of a failure that will occur in the future.

When supervisory service 310 determines that a failure of a network element is predicted, it may send a predicted failure notification 406 to device 308 that identifies the element predicted to fail, the time at which the failure is expected to occur, and potentially the probability of failure, as well. Depending on the timing and probability of failure, device 308 may opt to reroute the affected traffic, or a portion thereof. In turn, device 308 may monitor the element predicted to fail and provide feedback 408 to supervisory service 310 indicating whether the element actually failed and, if so, when. Supervisory service 310 can then use feedback 408 to determine whether model retraining should be initiated, such as by training a more granular model for the SD-WAN instance or the specific tunnel or path under scrutiny.

FIG. 4C illustrates an alternate implementation 410 in which supervisory service 310 pushes the failure prediction model to device 308 for local/on-premise inference. For example, supervisory service 310 may opt for device 308 to perform the local inferences, such as when model 412 requires too much bandwidth to send the needed telemetry to supervisory service 310 for cloud-based prediction. In turn, device 308 may use the corresponding telemetry measurements as input to trained model 412 and, if a failure is predicted, perform a corrective measure such as proactively rerouting the traffic to one or more other tunnels or other paths. In addition, device 308 may provide feedback 414 to supervisory service 310 that indicates false positives and/or false negatives by the model. For example, if device 308 reroutes traffic away from a element predicted by model 412 to fail, and the tunnel does not actually fail, device 308 may inform supervisory service 310. Supervisory service 310 may use feedback 414 to determine whether model 412 requires retraining, such as by adjusting which telemetry variables are used as input to the model, adjusting the granularity of the training (e.g., by using only training telemetry data is from the tunnel, etc.), or the like.

As noted above, machine learning now makes predictive routing possible in SD-WANs and other networks by predicting path or tunnel failures before they actually occur. However, the forecasting of extreme events, i.e., those that occur very rarely, is still quite challenging due to the great imbalance in the dataset used for training and testing the predictive models. This imbalance is due to the fact that there are many more negative examples (e.g., from normal operation) than positive examples (e.g., from the extreme events). Notably, in SD-WANs, for every example of a rare event, there are thousands of normal samples that must be analyzed.

The key problem with imbalanced datasets is that even a small classification error can lead to very poor Precision-Recall Curves (PRCs). Indeed, given an imbalance of 1:1000, a classification error of 1% (i.e., a model with 99% accuracy) will lead to 10 false positives for every true positive, thus leading to only 10% precision. Testing has shown that SD-WAN tunnel failures occur roughly every 3.5 days on average, thus leading to an imbalance of 1:5000 for datasets sampled at one minute. As a result, to achieve 95% precision, a classifier must be trained that has at least 99.999% accuracy. Indeed, given 200 positives and 1,000,000 negatives (1:5000 ratio), an error rate of 0.001% will lead to 10 false positives and 200 true positives. Even with such incredible accuracy, the system will still generate about 7,200 false alarms per day for the deployment of 500,000 tunnels, out of 720 million total samples.

Ensuring Backup Path Performance for Predictive Routing in SD-WANs

The techniques herein provide a mechanism that mitigates the effects of false positives by a failure prediction model for predictive routing in SD-WANs and other networks. Indeed, incorrectly predicting a tunnel or path failure can lead to traffic needlessly being rerouted onto a different tunnel or path and negatively impacting the traffic. However, as introduced herein, the downsides of false positives can be mitigated by ensuring that the traffic is rerouted onto a tunnel or path that offers similar QoS metrics as that of the original tunnel or path.

Specifically, according to one or more embodiments herein, a device predicts a failure of a first tunnel in a software-defined wide area network (SD-WAN). The device makes a prediction as to whether a second tunnel in the SD-WAN will satisfy a service level agreement (SLA) associated with traffic on the first tunnel. The device proactively reroutes the traffic from the first tunnel onto the second tunnel, based on the prediction as to whether that the second tunnel will satisfy the SLA of the traffic. The device monitors one or more quality of service (QoS) metrics for the rerouted traffic, to ensure that the second tunnel satisfies the SLA of the traffic.

Illustratively, the techniques described herein may be performed by hardware, software, and/or firmware, such as in accordance with the predictive routing process 248, which may include computer executable instructions executed by the processor 220 (or independent processor of interfaces 210) to perform functions relating to the techniques described herein.

Operationally, the core idea behind predictive routing relates to predicting/forecasting the failure of a link, node, tunnel, etc., so as to proactively reroute traffic onto a secondary/alternate/backup path. As noted above, this can be achieved by training a machine learning model to predict the failures, with the goal of the model training to maximize the recall of the model given a precision that meets or exceeds P_min, with P_min being close to 1.0. Indeed, a false positive of the model means that the predicted failure does not actually occur. Similarly, a false negative of the model means that the model failed to predict an actual failure. In general, false negatives are less problematic, as existing reactive routing mechanisms can still be used to reroute the traffic after the failure is detected. On the other hand, false positives can be quite problematic, since traffic may be rerouted onto secondary paths offering a lower SLA for the traffic, even though the primary tunnel did not fail. This is why high precision is desirable for failure prediction modeling, especially in the case of very unbalanced datasets.

Figure 5A:
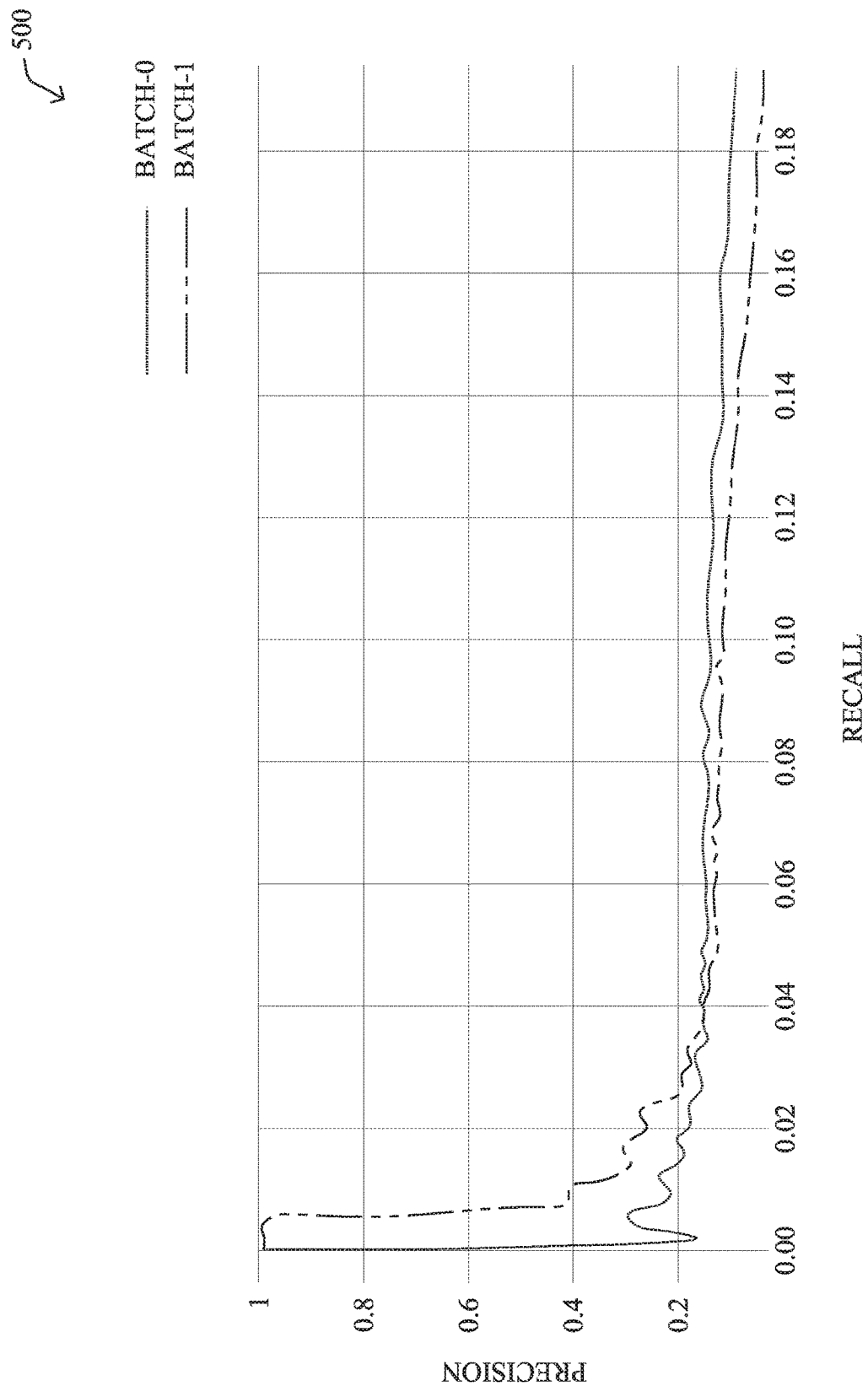
FIGS. 5A-5B illustrate example plots of precision-recall curves (PRCs)

FIG. 5A illustrates an example plot of a precision-recall curve (PRC) 500 for multiple datasets. As can be seen, the model performance greatly differs for the two datasets, batch-0 and batch-1, with a maximum recall R_max=0.5%. In other words, 0.5% of the failures can be predicted with a precision of at least 80%. Note that PRC 500 corresponds to the best/leading run per batch of test tunnels (i.e., not necessarily the same set of parameters for all runs).

Figure 5B:
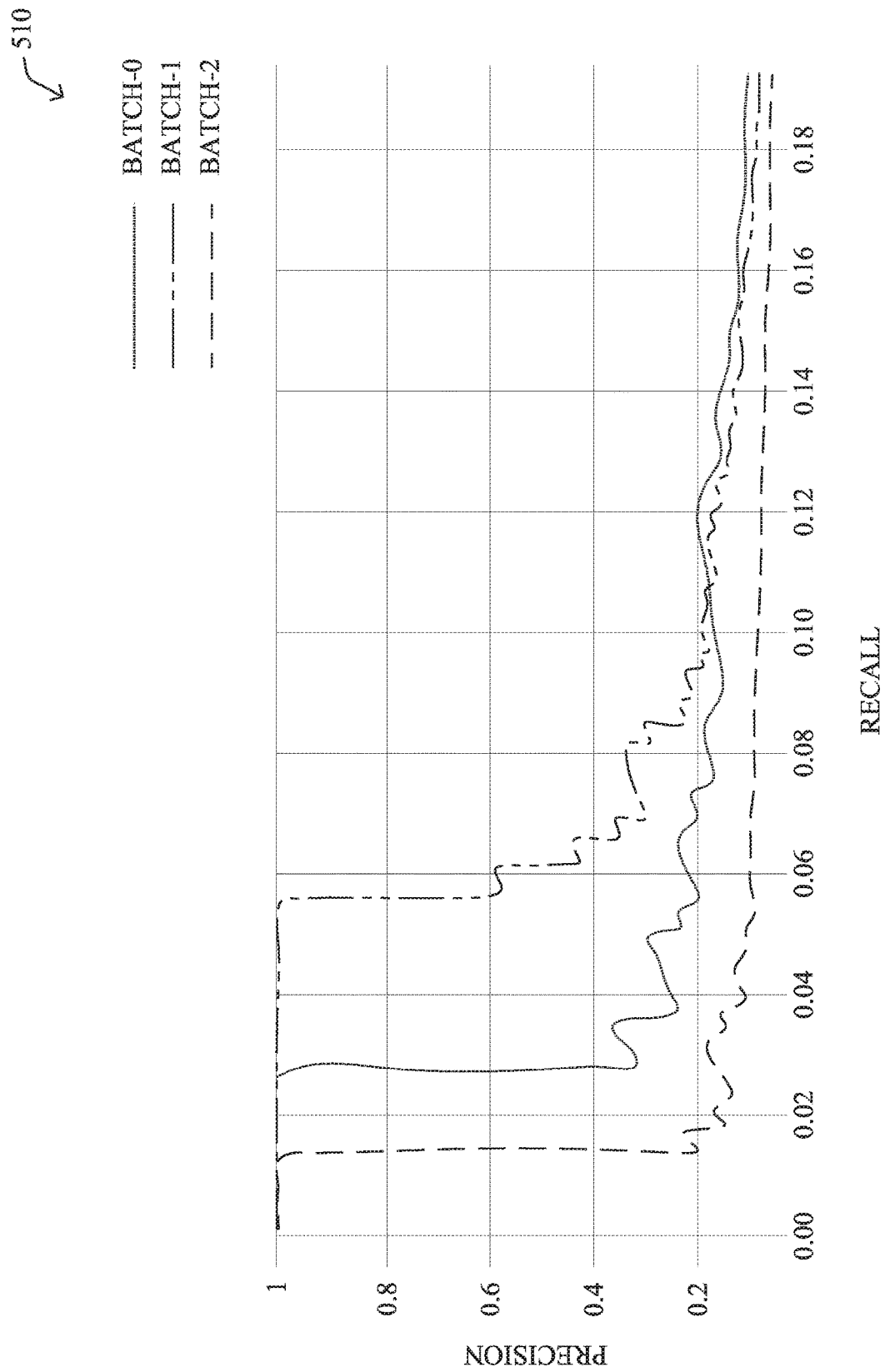

FIG. 5B illustrates another example plot of a PRC 510 for other datasets. In the example shown, the maximum recall R_max is close to 6%, a significant increase over that shown in FIG. 5A. Thus, the datasets used for training can greatly affect the performance of the model.

A key aspect of the techniques herein is to mitigate the negative effects of a false positive by ensuring that the traffic is rerouted onto a secondary path/tunnel that offers a similar QoS as that of the original. In such a case, if the system incorrectly predicts a failure and reroutes the traffic onto a secondary path/tunnel, the effects are greatly mitigated, making false positives by the prediction model less of a concern.

Note, however, that traffic is typically highly sensitive to jitter. Thus, switching traffic onto a backup path is not completely innocuous, since this may cause jitter to increase and lead to packet re-ordering, if there is a high delta in delays between the primary and backup tunnels. In order to address that potential concern, a policy rule may be used to specify the type of traffic eligible for pro-active rerouting due to a predicted failure, as well as whether the traffic should only be switched if an equivalent backup tunnel is found. In this context, an "equivalent" secondary tunnel is one that offers an SLA that meets the SLA requirements of the traffic to be rerouted.

Figure 6A:
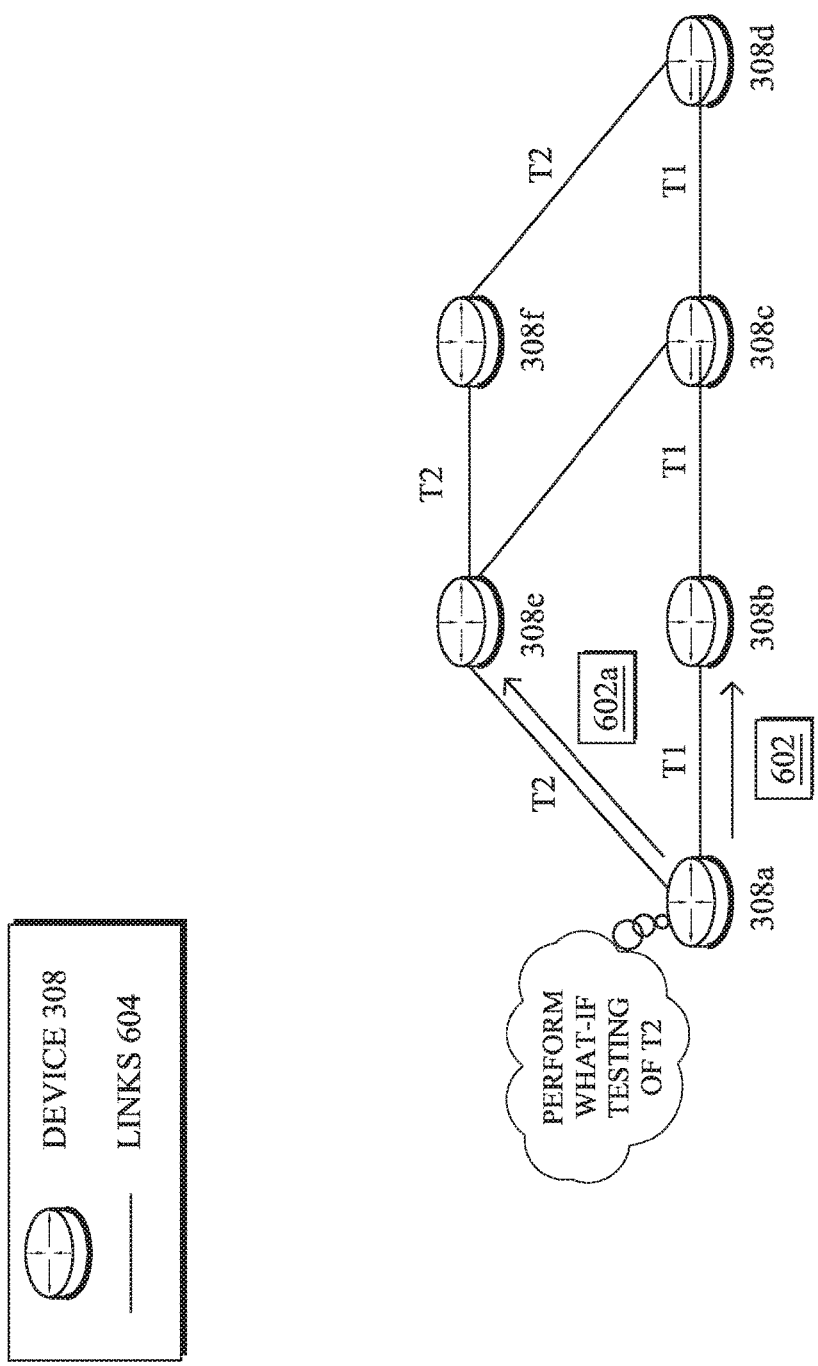
FIGS. 6A-6D illustrate examples of performing predictive routing while ensuring backup path performance in a network.

FIGS. 6A-6D illustrate examples of performing predictive routing while ensuring backup path performance in a network, according to various embodiments. As shown in FIG. 6A, a plurality of devices 308a-308f are interconnected by links 604 and a tunnel T1 connects a head-end device 308a with a tail-end device 308d. Further, assume that device 308a implements a predictive routing service in the network, either by executing a failure prediction model directly or by communicating with a centralized service that executes the model.

According to various embodiments, the predictive model employed to make predictive routing decisions may also perform what-if scenario predictions. In other words, the model may not only predict a failure of tunnel T1, but also assess whether rerouting the traffic 602 sent via tunnel T1 onto the secondary tunnel T2 will satisfy the SLA associated with traffic 602. To do so, device 308a may perform what-if testing of tunnel T2, to obtain training data for the model. Such testing allows the model to answer the question "if traffic 602 is rerouted onto tunnel T2, would tunnel T2 satisfy the SLA of traffic 602?"

More formally, given a target variable Y, the what-if modeling of tunnels T1 and T2 may model the influence of a series of variables $X=[X_1, X_2, \ldots, X_N]$ that can be constrained according to the scenario of interest. For instance, assuming Office365 and voice traffic is given by the variables $X_1$ and $X_2$, respectively, and that a link A carries $D_1$ and $D_2$ kbps of such traffic, the model may predict the SLA, given by the target variable Y, for link B with the constraint that X is unchanged, except for $X_1$ and $X_2$, which should be set to $X_1+D_1$ and $X_2+D_2$, respectively. Additional variables describing the traffic can also be used by the model. For instance, other variables can reflect the number of packets per second, as well as any other traffic characteristic that may impact tunnel utilization and performance.

Generally, the model may estimate the values for the $D_i$ variables based on recent historical statistics of the primary tunnel. For example, if the average throughput for the $i^{th}$ application (e.g., Office365, voice, etc.) over the last half-hour has been 200 kbps, then $D_i$ may be set to that value. In certain cases, the model may also account for the uncertainty and/or variability of the value $D_i$ and build an ensemble of such vectors, in order to have a realistic picture of the possible scenarios.

In some embodiments, the model may represent the traffic of the primary tunnel T1 as a probability distribution, considering various variations. For example, in the previous case above, device 308a may collect instantaneous throughput values for Office365 traffic over the last half-hour on tunnel T1, to build an empirical probability distribution representing the traffic 602 for that application. If there is a lot variability in the traffic 602, this may be a more precise representation of the traffic that will need to be handled by the backup tunnel rather than a single point estimate such as the mean or max would be.

The nature of the tunnel, as well as the network configuration, are essential to predicting the SLA under various traffic conditions. To this end, device 308a and/or the other devices 308 may collect the following information for model training:

The traffic conditions X described above, at regular time steps and for each tunnel.

The corresponding observed SLAs Y, at regular time steps and for each tunnel.

Contextual information C about the edge device and each of the tunnels.

The contextual information above includes information about configuration on the edge device 308 (e.g., routing, QoS), as well as on each of the tunnels T1 and T2, such as the type of the transport, corresponding ISP, geographical locations of the endpoints, information about the amount of bandwidth provisioned with the ISP when available, etc. As would be appreciated, C is a critical aspect of the techniques herein. Indeed, in many circumstances, the model used to predict outcomes for 'what-if scenarios' is highly dependent on the context. For example, consider the case of a Service Provider (SP) providing Internet connectivity. Typically, SPs adopt different strategies in terms of network engineering, over-booking ratios, QoS mechanisms, policy enforcement, and the like. Thus, providing the context as part of the collected information is critical for the training of an accurate model, and such context will be used as feature inputs to what-if learning.

As shown, in some cases, device 308a may perform stress testing of tunnel T2, to obtain training data for the what-if modeling. To do so, device 308a may reroute at least a portion of traffic 602 onto tunnel T2 and monitor the resulting QoS metrics on tunnel T2. More importantly, device 308a may increase the volume of traffic 602a on tunnel T2 until the SLA associated with traffic 602 is no longer met by tunnel T2. These boundary conditions are quite powerful, from a model training standpoint. In further cases, rather than rerouting live traffic onto tunnel T2 for purposes of what-if stress testing, device 308a may generate traffic that mimics the characteristics of traffic 602.

Figure 6B:
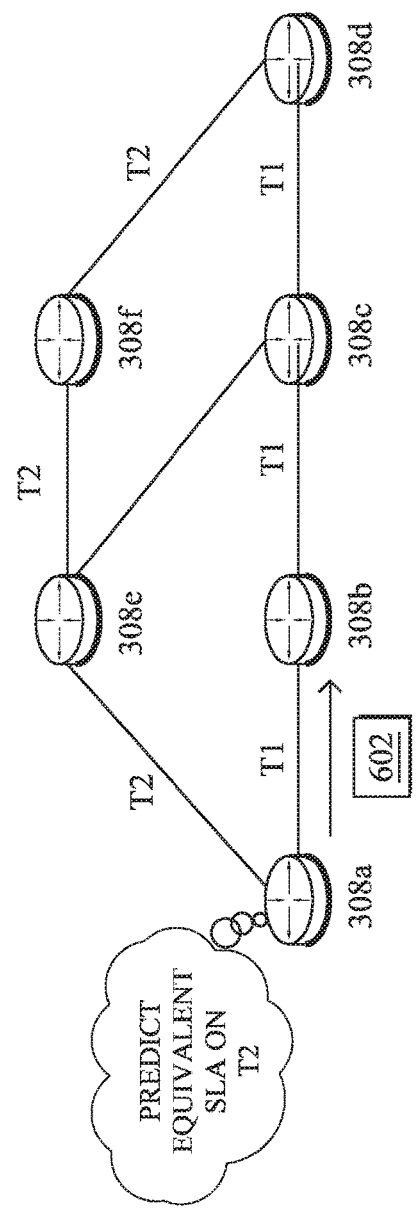

Once the model has been trained to perform what-if scenario assessment, as shown in FIG. 6B, device 308a is able to predict whether tunnel T2 is able to provide an equivalent SLA to traffic 602 as that of tunnel T1. To do so, traffic 602 is first routed onto tunnel T1 and captured and analyzed, to detect the nature (e.g., application ID) of traffic 602, along with its volume, etc. In some cases, it may even be possible for the model to predict the flow durations of traffic 602, based on historical data. In one embodiment such traffic analysis may be triggered on the fly upon receiving a failure prediction event. In another embodiment such analysis may be performed on a continuous basis relying on mechanisms such as NetFlow, IPFIX, NBAR, or the like. Such information is then sent to the model to be used as input features along with the required SLA for traffic 602, as configured by the end user according to policy.

Figure 6C:
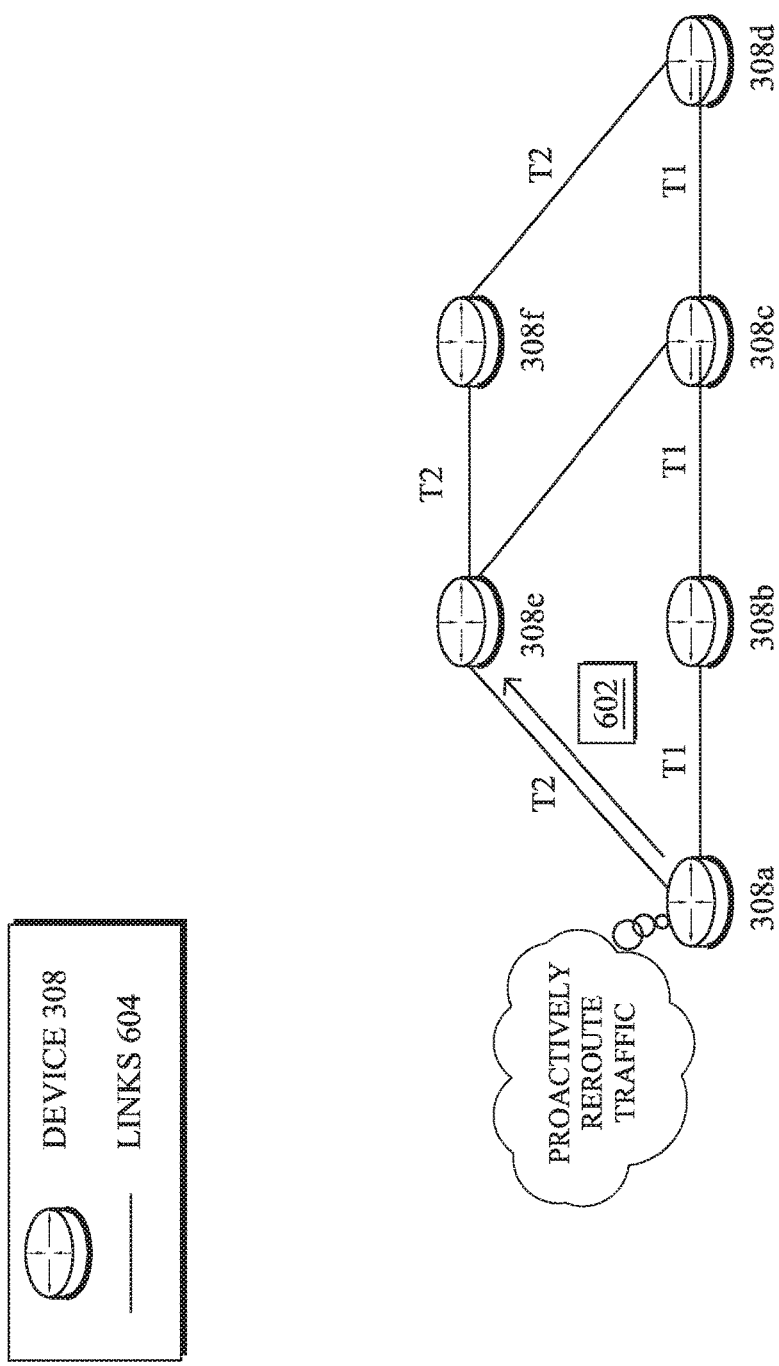

As shown in FIG. 6C, based on a prediction that tunnel T1 is going to fail, as well as prediction that tunnel T2 can satisfy the SLA of traffic 602, device 308a may proactively reroute traffic 602 onto tunnel T2, prior to the time at which tunnel T1 is predicted to fail. Doing so helps to minimize the effects of the tunnel failure on traffic 602 by rerouting traffic 602 before the failure occurs. In addition, even if the failure prediction is a false positive, ensuring that tunnel T2 can satisfy the SLA of traffic 602 before initiating the reroute will help to minimize the effects of the prediction being wrong.

If the what-if assessment indicates that tunnel T2 cannot satisfy the SLA of traffic 602, device 308a may still opt to reroute traffic 602 away from tunnel T1, depending on the circumstances. Of course, if another tunnel is predicted to satisfy the SLA of traffic 602, device 308a may simply use that tunnel, instead. In a further embodiment, even if no equivalent backup tunnel is found, device 308a may still opt to reroute traffic 602, based on the probability score associated with the tunnel failure prediction. For example, if tunnel T1 is predicted to fail with a very high probability, device 308a may still reroute traffic 602 onto tunnel T2, even if tunnel T2 is unable to meet the SLA of traffic 602. Indeed, even if tunnel T2 cannot meet the SLA of traffic 602, rerouting traffic 602 onto tunnel T2 may still be preferable to simply letting tunnel T1 fail with traffic 602 still on it.

Figure 6D:
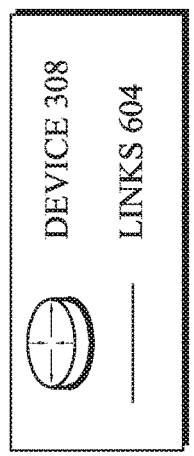
Figure 6D:
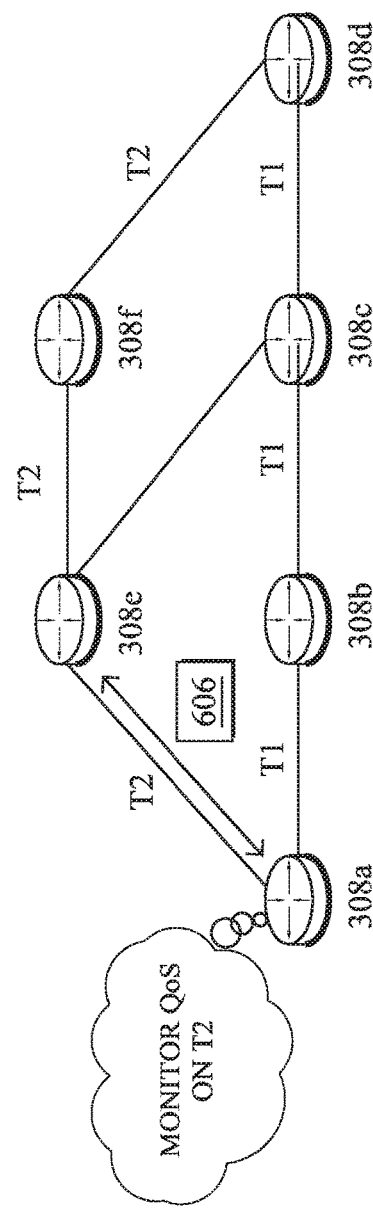

As shown in FIG. 6D, a further mechanism introduced herein is the continued monitoring of the QoS metrics 606 of the backup tunnel T2 after traffic 602 has been rerouted onto it. Doing so would allow for increasing the max recall, the main performance metric for predictive routing, to a point where precision drops or false positives are mitigated by the fact that proactive rerouting redirects traffic onto a secondary path that provides equivalent SLA, thus eliminating the downside of false positives.

In a further embodiment, rather than performing what-if scenario modeling before rerouting traffic onto tunnel T2, device 308a may instead employ a trial-and-error approach. Under this naïve approach, device 308a may systematically reroute traffic 602 onto tunnel T2, if active QoS measurements 606 of tunnel T2 indicate that tunnel T2 can satisfy the SLA requirements of traffic 602. In turn, similar to the predictive approach, device 308a may continue to monitor the QoS on tunnel T2 after the reroute of traffic 602, to ensure that tunnel T2 meets the SLA of the traffic.

Regardless of why device 308a proactively reroutes traffic from tunnel T1 onto tunnel T2, device 308a may employ active probing of the traffic onto tunnel T2 for a period of time $t_1$ where $t_1$>failure_prediction_time, i.e., the time at which tunnel T1 is predicted to fail. Note that the measured SLA must be performed for both the traffic routed onto the secondary tunnel T2, as well as for the traffic rerouted onto tunnel T2 from T1, to ensure that the secondary tunnel T2 is "equivalent" and the traffic originally routed onto the secondary tunnel is not impacted. To this end, device 308a may employ fast probing of tunnel T2, as opposed to using a slow probing approach consisting in sending BFD probes every second, in order to quickly detect any QoS degradation for both sets of traffic.

If device 308a determines that the QoS degradation on tunnel T2 is significant for either the traffic originally routed onto the secondary tunnel or the rerouted traffic, device 308a may decide to switch the traffic back to the primary tunnel before the time associated with the predicted failure of tunnel T1, in one embodiment. Further, if device 308a determines that the failure prediction was a false positive and that tunnel T1 did not actually fail at its predicted time, device 308a may opt to reroute traffic 602 back onto tunnel T1.

To test the techniques herein, an experiment was conducted by counting the percentage of examples for which traffic could be rerouted onto an alternate tunnel, with the constant that the alternate tunnel needs to meet the SLA of the traffic at the time of rerouting. Of course, the traffic also needs to share the same local and remote edge devices and be of less than or equal to the color specification of the tunnels. This was done for two subsets of examples, with one randomly selected, while the other comprising examples that occurred just prior to tunnel failure.

Figure 7:
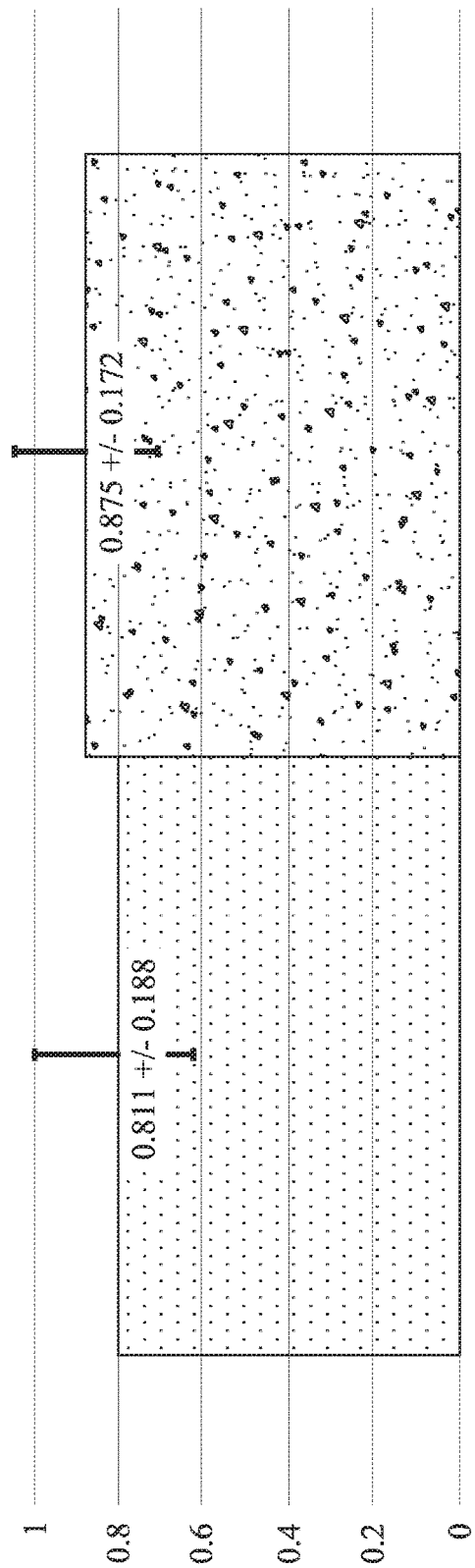
FIG. 7 illustrates an example plot of test results for the techniques herein.

FIG. 7 illustrates a plot 700 of the results of the above experiment. As shown, it was found that 87.5+/−17.2% of the randomly selected examples could be rerouted, averaged over approximately 500 tunnels. For the examples captured just prior to tunnel failure, this percentage was 81.1+/−18.8, averaged over the same set of tunnels. These two sets correspond to the two extreme cases of the spectrum, with the false positives of a failure prediction model likely to fall somewhere in the middle. As a result, there is a clear benefit of using the techniques herein to mitigate the effects of any false positives.

Figure 8:
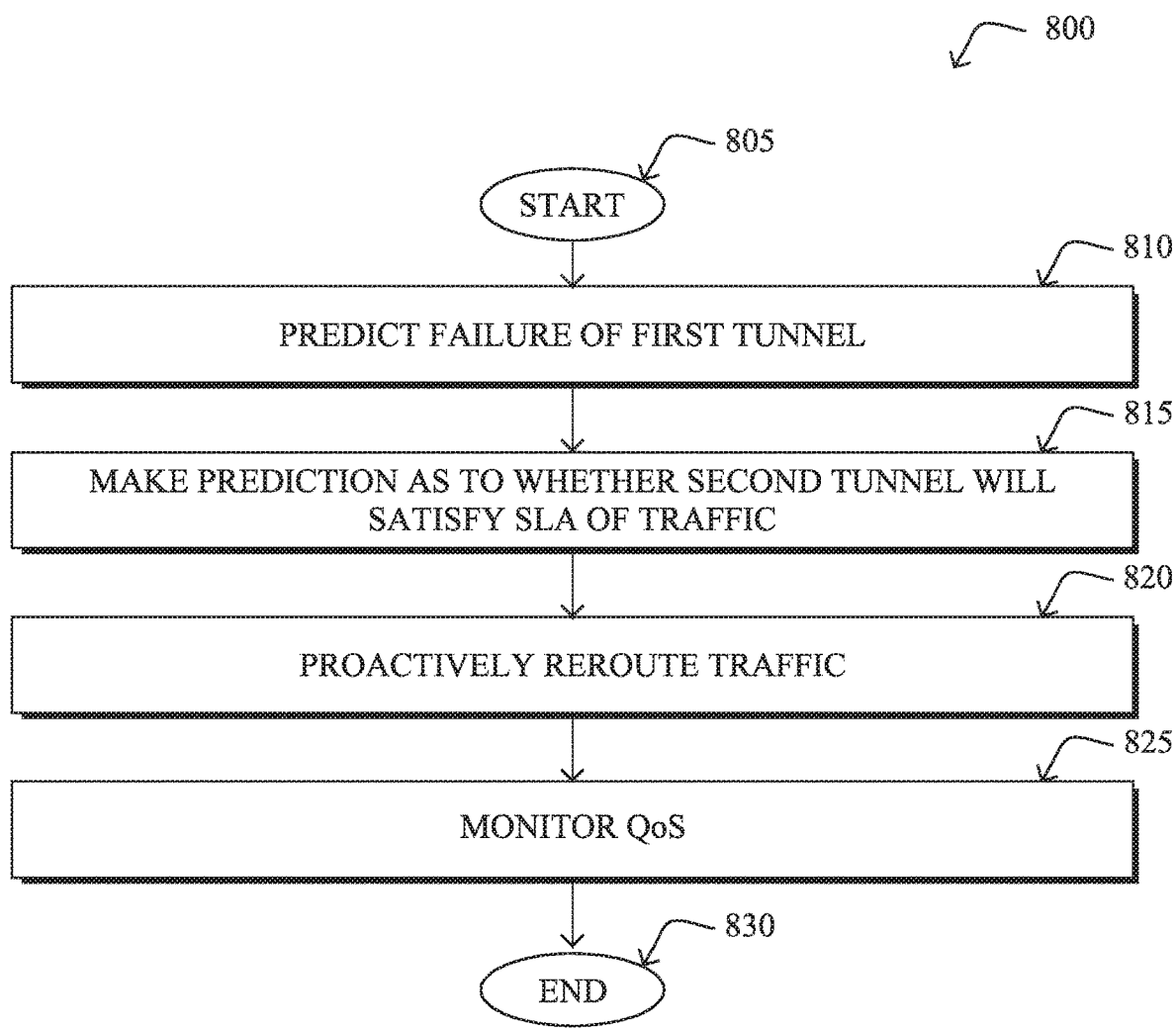
FIG. 8 illustrates an example simplified procedure for rerouting traffic in a network.

FIG. 8 illustrates an example simplified procedure for rerouting traffic in a network, in accordance with one or more embodiments described herein. For example, a non-generic, specifically configured device (e.g., device 200) may perform procedure 800 by executing stored instructions (e.g., process 248). For example, the device may be an edge router of an SD-WAN and/or a device in communication therewith, to implement predictive routing in the network. As shown, the procedure 800 may start at step 805 and continue on to step 810 where, as described in greater detail above, the device may predict a failure of a first tunnel in the SD-WAN. For example, the device may input telemetry data from the first tunnel to a prediction model trained to predict whether the tunnel is likely to fail. Associated with the prediction may also be a probability of the failure actually occurring and/or a time at which the failure is predicted to occur.

At step 815, as detailed above, the device may make a prediction as to whether a second tunnel in the SD-WAN will satisfy an SLA associated with traffic on the first tunnel. In some embodiments, the device may perform what-if stress testing of the second tunnel, to obtain training data to train a model to make this prediction. Such testing may, for example, take into account not only the current traffic load on the second tunnel, but also the additional traffic load on the second tunnel due to rerouting traffic from the first tunnel to the second. For example, the device may temporarily reroute at least a portion of the traffic onto the second tunnel, prior to predicting the failure of the first tunnel, and use QoS metrics obtained from the what-if test to train a machine learning model to predict whether the second tunnel in the SD-WAN will satisfy the SLA associated with the traffic.

At step 820, the device may proactively reroute the traffic from the first tunnel onto the second tunnel, based on the prediction as to whether that the second tunnel will satisfy the SLA of the traffic. For example, if the device predicts that the first tunnel will fail and that the second tunnel can satisfy the SLA of the traffic on the first tunnel, the device may reroute that traffic onto the second tunnel, prior to the predicted failure of the first tunnel. In a further embodiment, the device may still reroute the traffic onto the second tunnel, even when the prediction indicates that the second tunnel will not satisfy the SLA of the traffic, based on a probability of failure associated with the predicted failure of the first tunnel. Indeed, it may still be better to reroute the traffic onto a lower performing tunnel than to let the traffic stay on a tunnel with a high probability of failure.

At step 825, as detailed above, the device may monitor one or more QoS metrics for the rerouted traffic, to ensure that the second tunnel satisfies the SLA of the traffic. Notably, even after proactively rerouting the traffic onto the second tunnel, the device may continue to ensure that the second tunnel can meet the SLA of the traffic. For example, the device may initiate probing of the second tunnel at a faster rate than traditional BFD probing (e.g., more frequently than every minute), to continue to ensure that the second tunnel satisfies the SLA of the rerouted traffic. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the mitigation of false positives when performing predictive routing in a network, such as an SD-WAN. More specifically, in various aspects, the techniques herein help to ensure that any rerouting decisions for predicted failures will place the rerouted traffic onto an equivalent path/tunnel as that of the original, in terms of its SLA.

While there have been shown and described illustrative embodiments that provide for predictive routing in a network, it is to be understood that various other adaptations and modifications may be made within the spirit and scope of the embodiments herein. For example, while certain embodiments are described herein with respect to using certain models for purposes of predicting failures or evaluating what-if scenarios, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   predicting, by a device, a failure of a first tunnel in a software-defined wide area network (SD-WAN);
   making, by the device, a prediction as to whether a second tunnel in the SD-WAN will satisfy a service level agreement (SLA) associated with traffic on the first tunnel;
   proactively rerouting, by the device, the traffic onto the second tunnel to avoid the first tunnel, based on the prediction as to whether that the second tunnel will satisfy the SLA of the traffic; and
   monitoring, by the device, one or more quality of service (QoS) metrics for the rerouted traffic, to ensure that the second tunnel satisfies the SLA of the traffic.

2. The method as in claim 1, further comprising:
   determining, by the device, that the SLA of the traffic is not being met on the second tunnel, based on the monitored one or more QoS metrics; and
   rerouting, by the device, the traffic back onto the first tunnel, based on the determination.

3. The method as in claim 2, wherein the device reroutes the traffic back onto the first tunnel, prior to a time associated with the predicted failure of the first tunnel.

4. The method as in claim 1, wherein making the prediction as to whether the second tunnel in the SD-WAN will satisfy the SLA associated with the traffic on the first tunnel comprises:
performing a what-if test of the second tunnel by temporarily rerouting at least a portion of the traffic onto the second tunnel, prior to predicting the failure of the first tunnel; and
using QoS metrics obtained from the what-if test to train a machine learning model to predict whether the second tunnel in the SD-WAN will satisfy the SLA associated with the traffic.

5. The method as in claim 1, wherein the prediction as to whether the second tunnel in the SD-WAN will satisfy the SLA associated with the traffic on the first tunnel indicates that the second tunnel will not satisfy the SLA of the traffic, and wherein the device still reroutes the traffic onto the second tunnel based on a probability of failure associated with the predicted failure of the first tunnel.

6. The method as in claim 1, further comprising:
determining that the predicted failure of the first tunnel did not occur; and
rerouting the traffic back onto the first tunnel, based on the determination that the predicted failure did not occur.

7. The method as in claim 1, wherein the device is a head-end router of the first and second tunnels.

8. An apparatus, comprising:
one or more network interfaces to communicate with a software-defined wide area network (SD-WAN);
a processor coupled to the network interfaces and configured to execute one or more processes; and
a memory configured to store a process executable by the processor, the process when executed configured to:
predict a failure of a first tunnel in a software-defined wide area network (SD-WAN);
make a prediction as to whether a second tunnel in the SD-WAN will satisfy a service level agreement (SLA) associated with traffic on the first tunnel;
proactively reroute the traffic onto the second tunnel to avoid the first tunnel, based on the prediction as to whether that the second tunnel will satisfy the SLA of the traffic; and
monitor one or more quality of service (QoS) metrics for the rerouted traffic, to ensure that the second tunnel satisfies the SLA of the traffic.

9. The apparatus as in claim 8, wherein the process when executed is further configured to:
determine that the SLA of the traffic is not being met on the second tunnel, based on the monitored one or more QoS metrics; and
reroute the traffic back onto the first tunnel, based on the determination.

10. The apparatus as in claim 9, wherein the apparatus reroutes the traffic back onto the first tunnel, prior to a time associated with the predicted failure of the first tunnel.

11. The apparatus as in claim 8, wherein the apparatus makes the prediction as to whether the second tunnel in the SD-WAN will satisfy the SLA associated with the traffic on the first tunnel by:
performing a what-if test of the second tunnel by temporarily rerouting at least a portion of the traffic onto the second tunnel, prior to predicting the failure of the first tunnel; and
using QoS metrics obtained from the what-if test to train a machine learning model to predict whether the second tunnel in the SD-WAN will satisfy the SLA associated with the traffic.

12. The apparatus as in claim 8, wherein the prediction as to whether the second tunnel in the SD-WAN will satisfy the SLA associated with the traffic on the first tunnel indicates that the second tunnel will not satisfy the SLA of the traffic, and wherein the apparatus still reroutes the traffic onto the second tunnel based on a probability of failure associated with the predicted failure of the first tunnel.

13. The apparatus as in claim 8, wherein the process when executed is further configured to:
determine that the predicted failure of the first tunnel did not occur; and
reroute the traffic back onto the first tunnel, based on the determination that the predicted failure did not occur.

14. The apparatus as in claim 8, wherein the apparatus comprises a head-end router of the first and second tunnels.

15. A tangible, non-transitory, computer-readable medium storing program instructions that cause a device in a software-defined wide area network (SD-WAN) to execute a process comprising:
predicting, by the device, a failure of a first tunnel in the SD-WAN;
making, by the device, a prediction as to whether a second tunnel in the SD-WAN will satisfy a service level agreement (SLA) associated with traffic on the first tunnel;
proactively rerouting, by the device, the traffic onto the second tunnel to avoid the first tunnel, based on the prediction as to whether that the second tunnel will satisfy the SLA of the traffic; and
monitoring, by the device, one or more quality of service (QoS) metrics for the rerouted traffic, to ensure that the second tunnel satisfies the SLA of the traffic.

16. The computer-readable medium as in claim 15, wherein the process further comprises:
determining, by the device, that the SLA of the traffic is not being met on the second tunnel, based on the monitored one or more QoS metrics; and
rerouting, by the device, the traffic back onto the first tunnel, based on the determination.

17. The computer-readable medium as in claim 16, wherein the device reroutes the traffic back onto the first tunnel, prior to a time associated with the predicted failure of the first tunnel.

18. The computer-readable medium as in claim 15, wherein making the prediction as to whether the second tunnel in the SD-WAN will satisfy the SLA associated with the traffic on the first tunnel comprises:
performing a what-if test of the second tunnel by temporarily rerouting at least a portion of the traffic onto the second tunnel, prior to predicting the failure of the first tunnel; and
using QoS metrics obtained from the what-if test to train a machine learning model to predict whether the second tunnel in the SD-WAN will satisfy the SLA associated with the traffic.

19. The computer-readable medium as in claim 15, wherein the prediction as to whether the second tunnel in the SD-WAN will satisfy the SLA associated with the traffic on the first tunnel indicates that the second tunnel will not satisfy the SLA of the traffic, and wherein the device still reroutes the traffic onto the second tunnel based on a probability of failure associated with the predicted failure of the first tunnel.

20. The computer-readable medium as in claim 15, wherein the process further comprises:

determining that the predicted failure of the first tunnel did not occur; and rerouting the traffic back onto the first tunnel, based on the determination that the predicted failure did not occur.

\* \* \* \* \*

UNITED STATES PATENT AND TRADEMARK OFFICE
CERTIFICATE OF CORRECTION

PATENT NO. : 11,063,861 B2
APPLICATION NO. : 16/429159
DATED : July 13, 2021
INVENTOR(S) : Jean-Philippe Vasseur Page 1 of 1

It is certified that error appears in the above-identified patent and that said Letters Patent is hereby corrected as shown below:

In the Specification

Column 12, Line 25, please amend as shown:
telemetry data from the tunnel, etc.), or the like.

Column 14, Line 46, please amend as shown:
Generally, the model may estimate the values for the $D_i$ Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*